(12) United States Patent
Lincourt

(10) Patent No.: US 7,568,344 B2
(45) Date of Patent: Aug. 4, 2009

(54) HYDROSTATIC FLOW BARRIER FOR FLEXIBLE FUEL MANIFOLD

(75) Inventor: Claude Lincourt, St-Jean-sur-Richelleu (CA)

(73) Assignee: Frait & Whitney Canada Corp., Longueuil, Quebec (CA)

( * ) Notice: Subject to any disclaimer, the term of this patent is extended or adjusted under 35 U.S.C. 154(b) by 593 days.

(21) Appl. No.: 11/216,139

(22) Filed: Sep. 1, 2005

(65) Prior Publication Data

US 2007/0044765 A1    Mar. 1, 2007

(51) Int. Cl.
    *F02C 1/00*    (2006.01)
(52) U.S. Cl. .............................. 60/739; 60/746; 60/747; 60/734
(58) Field of Classification Search .................. 60/734, 60/739, 746, 747
    See application file for complete search history.

(56) References Cited

U.S. PATENT DOCUMENTS

| | | | |
|---|---|---|---|
| 4,258,544 | A | 3/1981 | Gebhart et al. |
| 4,467,610 | A | 8/1984 | Pearson et al. |
| 4,708,371 | A | 11/1987 | Elsworth et al. |
| 4,918,925 | A | 4/1990 | Tingle |
| 5,231,833 | A | 8/1993 | MacLean et al. |
| 5,269,468 | A | 12/1993 | Adiutori |
| 5,273,249 | A | 12/1993 | Peterson et al. |
| 5,423,178 | A | 6/1995 | Mains |
| 5,598,696 | A | 2/1997 | Stotts |
| 5,622,210 | A | 4/1997 | Crisman et al. |
| 5,761,907 | A | 6/1998 | Pelletier et al. |
| 5,771,696 | A | 6/1998 | Hansel et al. |
| 6,039,084 | A | 3/2000 | Martucci et al. |
| 6,064,000 | A | 5/2000 | Kim |
| 6,070,615 | A | 6/2000 | Chen |
| 6,149,075 | A | 11/2000 | Moertle et al. |
| 6,182,437 | B1 | 2/2001 | Prociw |
| 6,256,995 | B1 | 7/2001 | Sampath et al. |
| 6,276,141 | B1 | 8/2001 | Pelletier |
| 6,622,383 | B1 | 9/2003 | Moertle et al. |

FOREIGN PATENT DOCUMENTS

| | | |
|---|---|---|
| EP | 1138998 | 10/2001 |
| WO | WO 2004/076904 | 9/2004 |

OTHER PUBLICATIONS

International Search Report dated Dec. 18, 2006 for corresponding PCT International Application No. PCT/CA2006/001429.

*Primary Examiner*—Michael Cuff
*Assistant Examiner*—Phutthiwat Wongwian
(74) *Attorney, Agent, or Firm*—Ogilvy Renault LLP

(57) ABSTRACT

A fuel manifold segment (34) for gas turbine engines comprises a polymer tube (48) surrounded by a metallic braid layer (50). A hydrostatic flow barrier (56) is provided for preventing the polymer material of the tube (48) from flowing through the metallic braid layer (50) at with a location of a joint with a tube fitting (42) under an elevated temperature and compressed condition.

4 Claims, 3 Drawing Sheets

US 7,568,344 B2

HYDROSTATIC FLOW BARRIER FOR FLEXIBLE FUEL MANIFOLD

TECHNICAL FIELD

The present invention relates generally to gas turbine engines, and more particularly to an improved fuel manifold assembly for use in gas turbine engines.

BACKGROUND OF THE ART

Gas turbine engines must be run at very high temperatures, particularly in a combustor section thereof where engine fuel is burned in combination with high pressure air to form high temperature, high pressure combustion gases. These gases are used downstream of the combustor by a turbine section where the kinetic energy of the gases, powers the engine. Therefore, it is desirable to increase the temperature of the combustion gases for more effective engine performance. Nevertheless, the durability of an engine fuel system, particularly the durability of a flexible fuel manifold assembly positioned around the combustor, is challenged in such an elevated temperature environment. For example, fuel leakages from the flexible fuel manifold assembly, particularly fuel leakages from the joints thereof, are always issues of concern for engine designers.

Accordingly, there is a need to provide an improved fuel manifold assembly for gas turbine engines, in order to prevent fuel leakages therefrom and to increase the durability thereof.

SUMMARY OF THE INVENTION

It is therefore an object of this invention to provide an improved fuel manifold assembly for a fuel system of gas turbine engines.

In one aspect, the present invention provides a fuel manifold segment of a fuel system of gas turbine engines, which comprises a composite tube including a core layer of polymer material, a metallic braid layer surrounding the core layer and extending substantially over an entire length of the core layer. Means for preventing the polymer material of the core layer at a joint place with a tube fitting from flowing through the metallic braid layer under an elevated temperature and compressed condition.

In another aspect, the present invention provides a fuel manifold assembly positionable around a combustor of a gas turbine engine for distribution of fuel to a plurality of fuel injectors. The manifold assembly comprises a plurality of fuel injector base sections for connection with the respective fuel injectors, and a plurality of manifold segments interconnecting the respective fuel injector base sections. Each of the manifold segments includes a fire protective sleeve and a composite tube extending within and through the fire protective sleeve. The composite tube has a core layer including Teflon® material which has a joint with one of the fuel injector base sections, a metallic braid layer surrounding the core layer, and a hydrostatic flow barrier disposed between the core layer and the metallic braid layer for preventing the Teflon® material of the core layer at the joint thereof from flowing through the metallic braid layer under an elevated temperature and compressed condition.

In a further aspect, the present invention provides a method for making a fuel manifold segment which comprises (a) preparing a tube of Teflon® material; (b) providing a hydrostatic flow barrier layer around the prepared tube; and (c) adding a metallic braid layer around the hydrostatic flow barrier layer.

In a still further aspect, the present invention provides a method of preventing fuel leakage and improving temperature durability of a fuel manifold joint, which is defined by insertion of a fitting portion of a fuel injector base section into an open end of a composite tube having a core layer of polymer material surrounded by a metallic braid layer, the fitting portion being retained in position by a retainer compressing the composite tube onto the fitting portion. The method comprises adding a hydrostatic flow barrier layer between the core layer and the surrounding metallic braid layer at least in a location of the joint for preventing the polymer material of the core layer at the joint location from flowing through the metallic braid layer under an elevated temperature and compressed condition.

Further details of these and other aspects of the present invention will be apparent from the detailed description and drawings included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
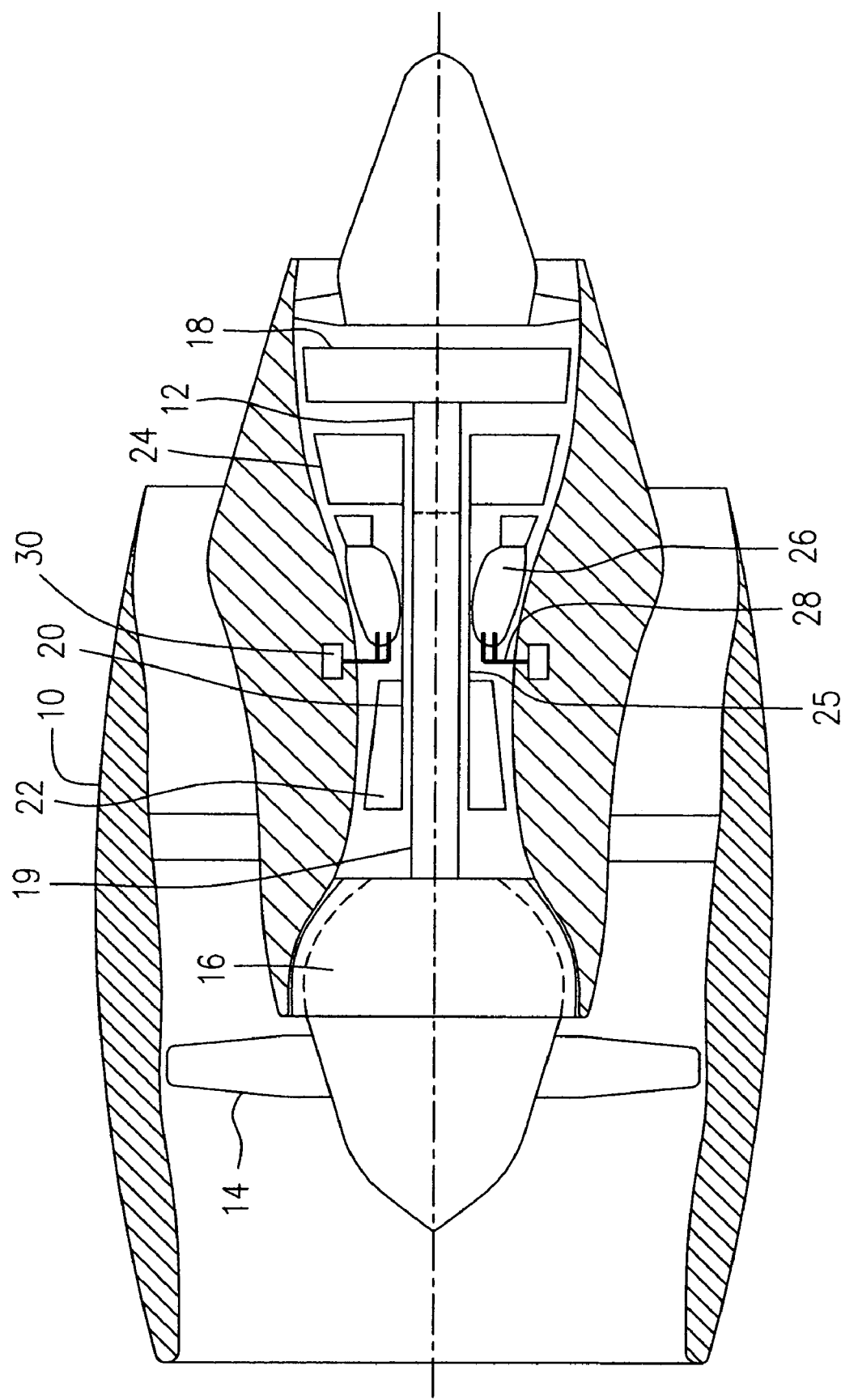
FIG. 1 is a schematic cross-sectional view of an exemplary turbofan gas turbine engine, showing an application of the present invention.

A typical application of the present invention for a turbofan engine illustrated schematically in FIG. 1, incorporates an embodiment of the present invention presented as an example of the application of the present invention. The turbofan engine includes a housing or nacelle 10, a low pressure spool assembly seen generally at 12 which includes a fan 14, low pressure compressor 16 and low pressure turbine 18 connected by shaft 19, and a high pressure spool assembly seen generally at 20 which includes a high pressure compressor 22 and a high pressure turbine 24 connected by shaft 25. There is provided an annular combustor 26 where hot combustion gases are produced to power the turbines 24 and 18. An engine fuel system including, for example, a plurality of fuel injectors 28 and a fuel manifold assembly 30, is provided for distributing fuel into the combustor 26 to be ignited for combustion.

One of the problems inherent in the operation of a gas turbine engine is the effect of high temperatures that are developed in the region of combustion. These high temperatures put a tremendous thermal strain on engine components. Even more importantly, safety hazards caused by high temperatures must be fully considered by the engine designers. Fuel leakage considerations become important in the area surrounding the combustor 26. Therefore, the engine fuel system must be operated in a safe and reliable manner. In a typical gas turbine engine, the temperature around the annular combustor 26 is over 800° F.

Figure 2:
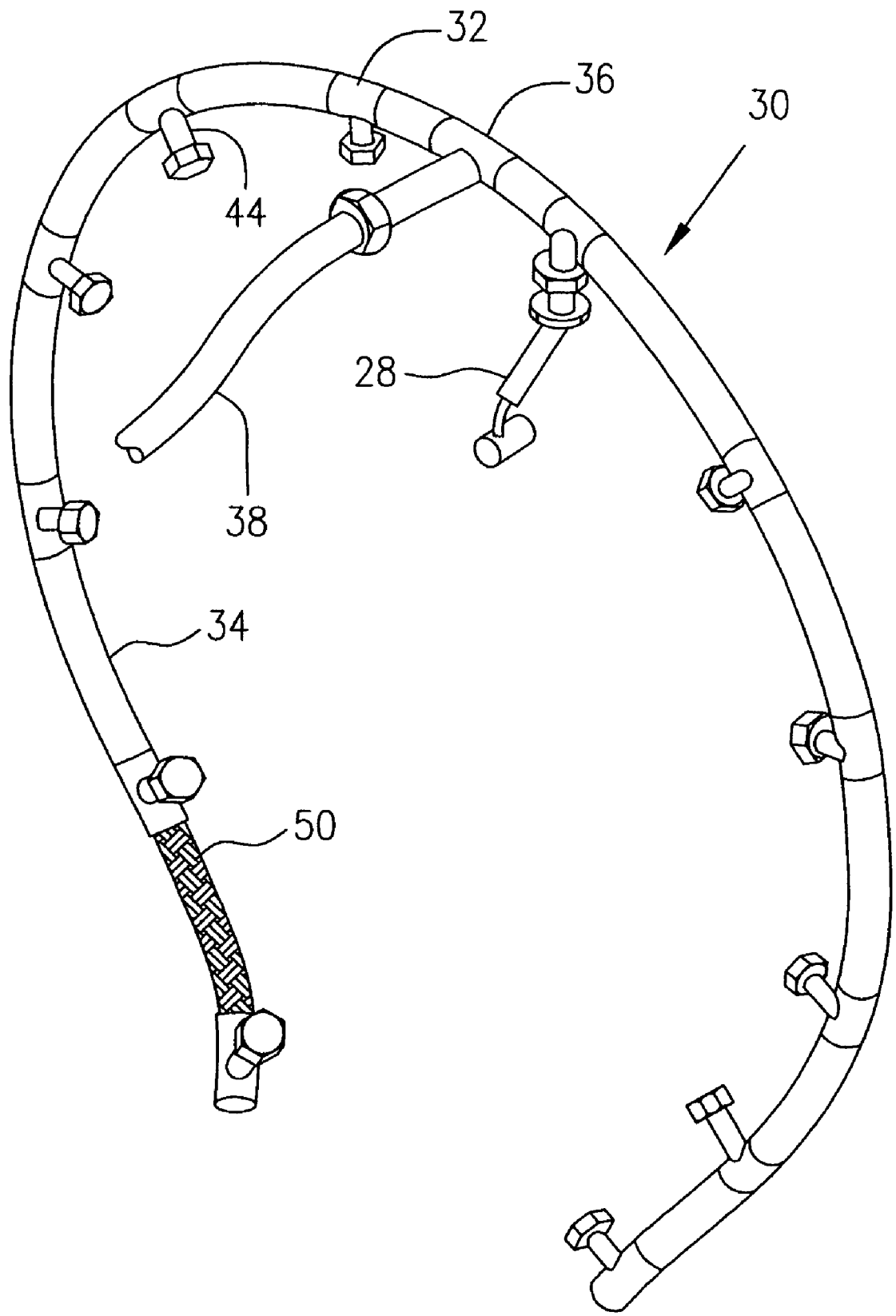
FIG. 2 is a perspective view of a fuel manifold assembly in accordance with one embodiment of the present invention.
Figure 3:
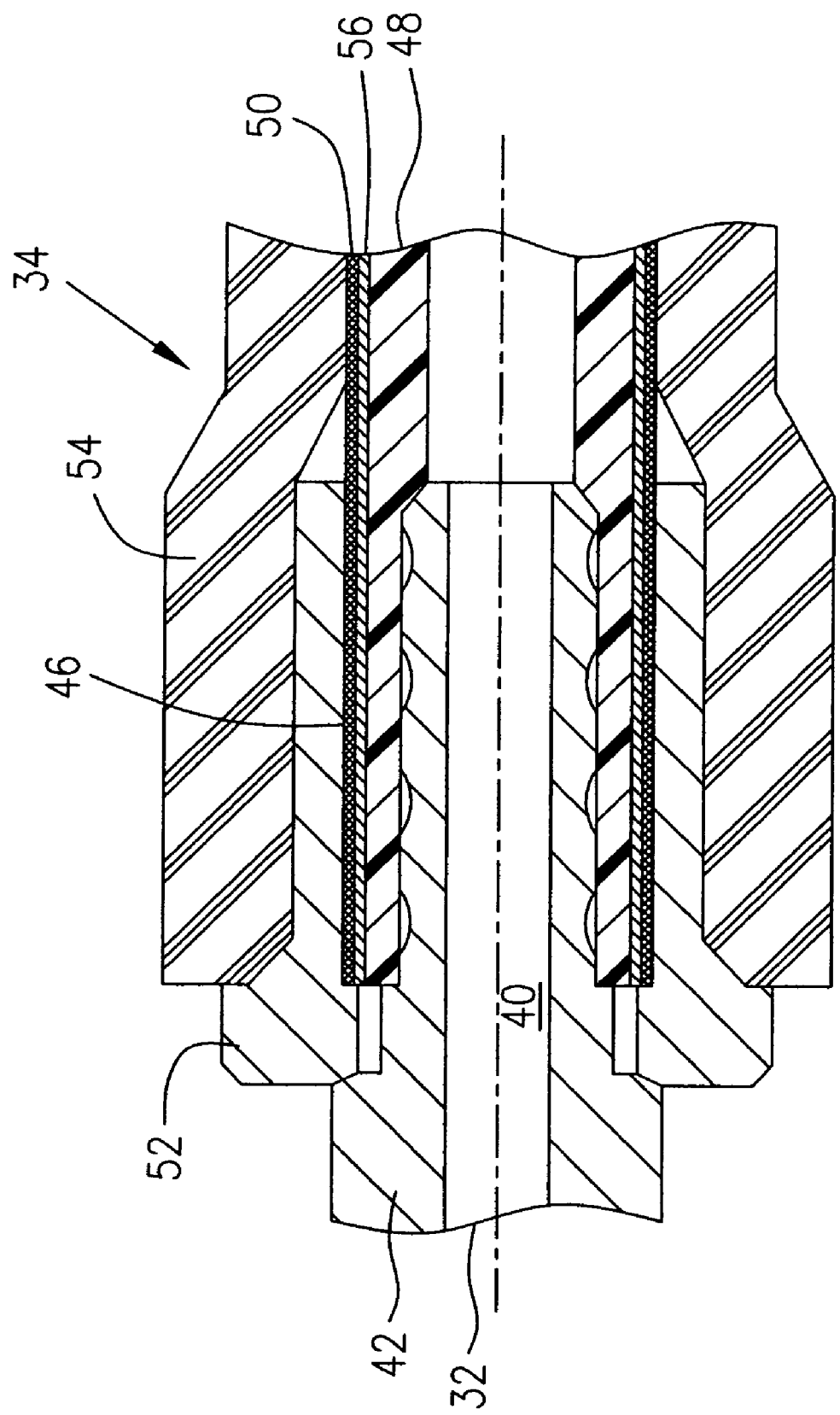
FIG. 3 is a partial cross-sectional view of a fuel manifold segment used in the embodiment of the fuel manifold assembly of FIG. 2.

Referring now to FIGS. 1-3, the fuel manifold assembly 30, preferably a flexible fuel manifold assembly, forms a part of the engine fuel system and is positionable around the combustor 26, for distribution of fuel to the fuel injectors 28 which are affixed to and extend into the combustor 26. The fuel manifold assembly 30 includes a plurality of fuel injector base sections 32 for connection with the respective fuel injectors 28 (only one is shown in FIG. 2). A plurality of manifold segments 34 are provided which interconnect the respective fuel injector base sections 32. The fuel manifold assembly 30 further includes an inlet joint 36. The inlet joint 36 is preferably a T-shaped three-way joint having opposite open ends connecting two adjacent manifold segments 34, and is adapted to be coupled at a third open end thereof with a fuel-supply tube 38 such that fuel is pumped through the fuel supply tube 38 into the fuel manifold assembly 30 and is then directed by a fuel passage 40 (see FIG. 3) defined within the manifold assembly 30 and extending through the individual manifold segments 34 and the individual fuel injector base sections 32, into the individual fuel injectors 28 to be injected into the combustor 26 for ignition and combustion.

The fuel injector base section 32 is also preferably a T-shaped three-way joint having opposite open ends forming a pair of tube fittings 42 (only one shown in FIG. 3) for connection with a pair of manifold segments 34, respectively. A third open end 44 of the fuel injector base section 32 is adapted to be connected with the individual fuel injectors 28.

Each of the manifold segments 34 includes a composite tube 46 which has a core layer 48 of polymer material, preferably a Teflon® material, and a metallic braid layer, preferably a stainless steel braid layer 50, surrounding the core layer 48 and extending substantially over an entire length of the core layer 48. The core layer 48 of Teflon® material and stainless steel braid layer 50 provide the required flexibility of the composite tube and thus the flexibility of the fuel manifold assembly. The composite tube 46 is connected to the fuel injector base section 32 by way of insertion of one tube fitting 42 of the fuel injector base section 32 into an open end of the composite tube 46, and the connection is retained by a retainer, preferably a swaged ferrule 52 which is crimped to compress the end section of the composite tube 46 of the tube fitting 42.

It is preferable to provide a fire protective sleeve 54 surrounding the composite tube 46 extending substantially over the entire length of the composite tube 46. The fire protective sleeve 54 of one manifold segment 34 is removed in FIG. 2 in order to show the stainless steel braid layer 50 of the composite tube 46. The function of the fire protective sleeve 54 will be further described hereinafter.

As discussed above, the fuel manifold assembly is positioned around the combustor 26 and therefore works under elevated temperature conditions. Under such elevated temperature conditions, the Teflon® material of the core layer 48 of the composite tube 46, particularly the end section thereof at the location of the joint with the tube fitting 42 which is compressed by the swaged ferrule 52, has a tendency to become somewhat plastic-flowable and to flow through the pores of the stainless steel braid layer 50. This has been identified as the exact fuel leakage mechanism of the joint section between the manifold segment and the fuel injector base section, in contrast to the conventional industrial explanation for leaking mechanisms of such joints.

In accordance with one embodiment of the present invention there is therefore provided a means for preventing plastic flow of the polymer or Teflon® material of the core layer 48, preferably a hydrostatic metallic flow barrier, for example a thin metallic foil 56, which is disposed between the core layer 48 of Teflon® material and the stainless steel braid layer 50, and which surrounds the core layer 48 and extends substantially over the entire length of the core layer 48. The thin metallic foil 56 deforms under pressure to limit the plastic flow of the Teflon® material through the pores of the stainless steel braid layer 50 when the temperature is greater than 450° F., thereby effectively preventing fuel leakage from the joint between the manifold segment 34 and the tube fitting 42 of the fuel injector base section 32.

According to another embodiment of the present invention, a thin layer of polymer material of a type which is adapted for resistance to high temperatures, as an alternative to the metallic foil 56, can be used to form a hydrostatic flow barrier for preventing the plastic flow of the Teflon® material of the core layer 48.

Although the hydrostatic flow barrier such as the thin metallic foil 56 is needed to surround the core layer at the open end section for covering the location of the joint, it is convenient to provide a layer of metallic foil 56 between the core layer 48 of the Teflon® material and the stainless steel braid layer 50, which surrounds the core layer 48 and extends substantially over the entire length of the core layer 48 during fabrication of the composite tube 46. In addition to the convenience of fabrication, the thin metallic foil 56 extending substantially over the entire length of the core layer 48, may also advantageously increase the temperature durability of the entire composite tube 46.

In one embodiment of the present invention, the composite tube 46 for the fuel manifold segments 34 can be fabricated in a tube fabrication process in which a section of a tube of Teflon® material (or other polymer material) is first prepared, and then a hydrostatic flow barrier layer, for example the thin metallic foil 56, is provided around the section of the prepared tube. Finally, the stainless steel braid layer 50 is added around the hydrostatic flow barrier layer. The composite tube 46 is then cut into a predetermined length and is used as a manifold segment 34. Each section of the composite tube 46 as one of the manifold segments 32, is then preferably inserted into the fire protective sleeve 54 which has a length substantially equal to the length of the composite tube 46 but has an enlarged diameter at opposed ends thereof for accommodating the individual swaged ferrule 52 attached to the open end of the composite tube 46 therearound. After the tube fitting 42 of the fuel injector base section 32 is inserted into the open end of the composite tube 46, the swaged ferrule 52 is crimped to secure the joint of the open end of the composite tube 46 and the tube fitting 42 of the fuel injector base section 32.

The fire protective sleeve 54 is preferably made of a silicon material. The silicon fire protective sleeve will burn and rapidly absorb local heat energy during a fire incident, thereby functioning as an extinguisher.

The connection between the inlet joint 36 and an open end of a manifold segment 34 is configured similarly with the joint of the open end of the manifold segment 34 and the tube fitting 42 of the fuel injector base section 32, and therefore is not redundantly described.

The present invention effectively reduces the risk of fuel leakage of the joints of the fuel manifold assembly 30 and thus increases the temperature durability of the fuel manifold assembly 30. Therefore, the fuel manifold assembly 30 can be used in fuel systems operating at a higher temperatures.

The above description is meant to be exemplary only, and one skilled in the art will recognize that changes may be made to the embodiments described without departure from the scope of the invention disclosed. For example, the present invention can be applied to any type of gas turbine engine, not only the turbofan gas turbine engine which is used as an example only to illustrate the application of the present invention. The swaged ferrule is used as an example of a retainer for securing the joint of an open end of the manifold segment and a tube fitting of the fuel injector base section. Retainers and fasteners for this purpose are known in the art and have many variations such as clamps, threaded connectors, etc., which can be used in other embodiments of the present invention as an alternative to the swaged ferrule. Still other modifications which fall within the scope of the present invention will be apparent to those skilled in the art, in light of a review of this disclosure, and such modifications are intended to fall within the appended claims.

The invention claimed is:

1. A fuel manifold assembly positionable around a combustor of a gas turbine engine for distribution of fuel to a plurality of fuel injectors, the manifold assembly comprising:
   a plurality of fuel injector base sections for connection with the respective fuel injectors; and
   a plurality of manifold segments interconnecting the respective fuel injector base sections, each of the manifold segments including a fire protective sleeve and a composite tube extending within and through the fire protective sleeve, the composite tube having
      a core layer including a polymer material, the core layer having a joint with one of the fuel injector base sections,
      a metallic braid layer surrounding the core layer, and
      a hydrostatic flow barrier disposed between the core layer and the metallic braid layer for preventing the polymer material of the core layer at the joint thereof from flowing through the metallic braid layer under an elevated temperature and compressed condition; and
   wherein each fuel injector base section comprises a pair of fitting portions, each of the fitting portion being inserted into an end of one manifold segment and retained in position by a retainer, the retainer being disposed between the metallic braid layer and the fire protective sleeve, compressing the end of the composite tube on the fitting portion.

2. The fuel manifold assembly as claimed in claim 1 wherein the hydrostatic flow barrier comprises a layer of metallic foil surrounding the core layer and extending substantially over an entire length of the core layer.

3. The fuel manifold assembly as claimed in claim 1 wherein the hydrostatic flow barrier comprises a layer of polymer material surrounding the core layer and extending substantially over an entire length of the core layer.

4. The fuel manifold assembly as claimed in claim 1 wherein the fire protective sleeve comprises a silicon material.

* * * * *

UNITED STATES PATENT AND TRADEMARK OFFICE
CERTIFICATE OF CORRECTION

PATENT NO. : 7,568,344 B2 Page 1 of 1
APPLICATION NO. : 11/216139
DATED : August 4, 2009
INVENTOR(S) : Claude Lincourt It is certified that error appears in the above-identified patent and that said Letters Patent is hereby corrected as shown below:

On the Title Page:

Item (73) delete "Frait" and insert --Pratt--

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,568,344 B2 |
| APPLICATION NO. | : 11/216139 |
| DATED | : August 4, 2009 |
| INVENTOR(S) | : Claude Lincourt |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 736 days.

Signed and Sealed this

Seventh Day of September, 2010

David J. Kappos
*Director of the United States Patent and Trademark Office*